(12) United States Patent
Wenzel et al.

(10) Patent No.: US 8,041,529 B2
(45) Date of Patent: Oct. 18, 2011

(54) CHANGING PARAMETERS IN A TESTED SYSTEM USING VIRTUAL WORKING PAGES

(75) Inventors: Thilo Wenzel, Stuttgart (DE); Don Nutter, Ann Arbor, MI (US); Matthew Hanson, Chanhassen, MN (US); Oliver Schade, Ann Arbor, MI (US); Eduard Bachner, Stuttgart (DE); Matthias Gekeler, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/704,648

(22) Filed: Feb. 9, 2007

(65) Prior Publication Data

US 2008/0195356 A1    Aug. 14, 2008

(51) Int. Cl.
*G06F 15/177* (2006.01)
*G06F 9/00* (2006.01)
*G06F 1/00* (2006.01)
*G06F 19/00* (2006.01)

(52) U.S. Cl. ............. 702/118; 73/1.01; 702/187; 713/1; 713/100; 715/700; 715/771

(58) Field of Classification Search ............ 701/53, 701/1, 36, 45, 51, 58, 67, 69, 70, 99, 101, 701/102, 103, 104, 105; 702/108, 117, 118, 702/123, 1, 85, 105, 113, 127, 187, 188; 711/126, 1, 3, 100, 117, 118; 73/1.01, 1.02, 73/1.03, 1.08, 1.16, 1.37, 1.42, 1.57, 1.73, 73/1.75, 1.76, 1.77, 1.78, 1.82, 19.01, 23.2, 73/23.21, 23.22, 23.23, 23.28, 23.35, 24.01, 73/25.01, 29.01, 865.9; 324/73, 76.1, 158.1; 340/500, 540, 870.01, 870.04, 870.07, 870.16; 700/1, 28, 71, 73, 83, 90, 275; 713/1, 2, 713/100; 715/700, 748, 749, 764, 771, 773; 718/1

See application file for complete search history.

(56) References Cited

U.S. PATENT DOCUMENTS

| | | | | |
|---|---|---|---|---|
| 2,996,666 A | * | 8/1961 | Shields | 324/73.1 |
| 3,082,374 A | * | 3/1963 | Buuck | 324/73.1 |
| 3,237,100 A | * | 2/1966 | Chalfin et al. | 324/108 |

(Continued)

FOREIGN PATENT DOCUMENTS

WO    WO 01/31515 A1  *  5/2001

(Continued)

OTHER PUBLICATIONS

Definition of virtual: from Merriam-Webster On line Dictionary, downloaded on Jan. 18, 2011 from merriam-webster.com/dictionary/virtual.*

(Continued)

*Primary Examiner* — Edward Cosimano
(74) *Attorney, Agent, or Firm* — Merchant & Gould P.C.

(57) ABSTRACT

Methods and systems for managing virtual working pages are disclosed. One method includes storing a first set of parameters in a working page within the tested system, where the first set of parameters is used for calibration of the tested system. The method also includes storing a second set of parameters in a virtual working page within an observation system having a plurality of virtual working pages. The method further includes transferring the second set of parameters from the observation system to the tested system. The method also includes storing one or more parameters of the second set of parameters in the working page. A related user interface is also disclosed.

4 Claims, 7 Drawing Sheets

U.S. PATENT DOCUMENTS

| | | | |
|---|---|---|---|
| 3,333,250 A * | 7/1967 | Hill et al. | 711/118 |
| 4,168,796 A * | 9/1979 | Fulks et al. | 714/734 |
| 4,403,303 A * | 9/1983 | Howes et al. | 703/27 |
| 4,418,392 A * | 11/1983 | Hata | 702/91 |
| 4,620,273 A * | 10/1986 | Mitani et al. | 700/7 |
| 4,788,657 A * | 11/1988 | Douglas et al. | 710/104 |
| 4,974,151 A * | 11/1990 | Advani et al. | 710/8 |
| 4,974,181 A * | 11/1990 | Sinderson et al. | 702/182 |
| 4,979,107 A * | 12/1990 | Advani et al. | 710/100 |
| 5,056,001 A * | 10/1991 | Sexton | 710/10 |
| 5,681,285 A * | 10/1997 | Ford et al. | 604/151 |
| 6,012,156 A * | 1/2000 | Zydek et al. | 714/736 |
| 6,049,870 A | 4/2000 | Greaves | 713/1 |
| 6,172,521 B1 * | 1/2001 | Motomura | 326/40 |
| 6,269,340 B1 * | 7/2001 | Ford et al. | 705/3 |
| 6,415,200 B1 * | 7/2002 | Kato et al. | 700/193 |
| 6,467,049 B1 * | 10/2002 | Robins et al. | 714/13 |
| 6,505,105 B2 * | 1/2003 | Allen et al. | 701/33 |
| 6,512,974 B2 * | 1/2003 | Houston et al. | 701/115 |
| 6,542,789 B2 * | 4/2003 | Ufheil | 700/275 |
| 6,622,067 B1 * | 9/2003 | Lovelace et al. | 701/19 |
| 6,633,784 B1 * | 10/2003 | Lovelace et al. | 700/65 |
| 6,671,748 B1 * | 12/2003 | Cole et al. | 710/8 |
| 6,845,279 B1 * | 1/2005 | Gilmore et al. | 700/115 |
| 6,928,362 B2 * | 8/2005 | Meaney | 701/115 |
| 7,113,883 B1 * | 9/2006 | House et al. | 702/122 |
| 7,162,339 B2 * | 1/2007 | Nguyen | 701/33 |
| 7,162,554 B1 * | 1/2007 | Cole et al. | 710/104 |
| 7,266,432 B2 * | 9/2007 | Hedges | 701/29 |
| 7,471,994 B2 * | 12/2008 | Ford et al. | 700/282 |
| 2001/0032031 A1 * | 10/2001 | Ufheil | 700/169 |
| 2002/0077852 A1 * | 6/2002 | Ford et al. | 705/2 |
| 2002/0091462 A1 * | 7/2002 | Allen et al. | 700/176 |
| 2002/0133268 A1 * | 9/2002 | Kato et al. | 700/193 |
| 2004/0249558 A1 * | 12/2004 | Meaney | 701/115 |
| 2006/0047381 A1 * | 3/2006 | Nguyen | 701/29 |
| 2008/0282181 A1 * | 11/2008 | Ferguson | 715/771 |

FOREIGN PATENT DOCUMENTS

WO    WO 2008/095829 A1 *    8/2008

OTHER PUBLICATIONS

Thomson: "SpeedTouch 536 Residential ADSL Gateway: User's Guide, Release R5. 3.1"[Online] May 2005, pp. 1-104, XP002478103.

Thomson: "Excerpt from SpeedTouch 536 Residential ADSL Gateway: CLI Reference Guide, Release R5. 3.1" [Online] May 2005, pp. 1-90, XP002478104.

* cited by examiner

CHANGING PARAMETERS IN A TESTED SYSTEM USING VIRTUAL WORKING PAGES

TECHNICAL FIELD

The present disclosure relates to management of virtual pages. In particular, the present disclosure relates to changing parameters in a tested system using virtual working pages.

BACKGROUND

Calibration of a system for determining an optimal operational configuration generally requires monitoring operation of the tested system, and adjusting one or more parameters affecting operation of the tested system until the system reaches a desired performance level. Observation systems exist which are configured to monitor the activity of the tested system so that calibration of that system can take place. One possible system requiring testing and calibration is an Electronic Control Unit (ECU), such as those found in vehicle control systems for determining fuel consumption, monitoring exhaust gas valves, and other physical characteristics of the vehicle.

Generally, tested systems such as ECU's contain some additional memory used to save changed parameter values, referred to as a "working page". The size of the working page is generally limited due to cost reduction of the tested system. Therefore, the number of changed parameter values is limited.

Various methods of calibration of these tested systems are known. Such methods generally involve changing in a subsequent way one parameter after another to change the behavior of the tested system. Existing tools also load a file containing parameter values into the working page of a tested system. These existing methods are inconvenient and time-consuming, because of the various loading and parameter changing steps involved.

For these and other reasons, improvements are desirable.

SUMMARY

In accordance with the present disclosure, the above and other problems are solved by the following:

In a first aspect, a method of changing parameters in a tested system is disclosed. The method includes storing a first set of parameters in a working page within the tested system, where the first set of parameters is used for calibration of the tested system. The method also includes storing a second set of parameters in a virtual working page within an observation system having a plurality of virtual working pages. The method further includes transferring the second set of parameters from the observation system to the tested system. The method also includes storing one or more parameters of the second set of parameters in the working page.

In a second aspect, an observation system interfaceable with a tested system is disclosed. The observation system includes a memory configured to store a plurality of virtual working pages. The working pages each include a set of parameters useable for calibration of the tested system. The observation further includes a display device, and a programmable circuit operatively connected to the memory and the display device. The programmable circuit is configured to execute program instructions to display one or more of the plurality of virtual working pages on the display device. The programmable circuit is further configured to execute program instructions to receive a selection of one of the virtual working pages. The programmable circuit is further configured to execute program instructions to transfer a set of parameters from the selected virtual working page from the observation system to the tested system.

In a third aspect, a method for displaying in a display device a plurality of working pages containing parameters useable for calibration of a tested system is disclosed. The method includes storing the plurality of virtual working pages in a memory of the computer system. The method further includes displaying a table having columns and rows, at least one column representing the contents of one of the plurality of virtual working pages, the rows representing parameters useable for calibration of the tested system.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, (2) a sequence of computer implemented steps, operations, or procedures running on a programmable circuit within a motor vehicle or vehicle test system; and/or (3) interconnected machine modules or program engines within the programmable circuits.

In general the present disclosure relates to management of virtual working pages in an observation system in order to control parameters of a tested system. By communicating the contents of one or more of the virtual working pages from the observation system to the test system, a variety of sets of test parameters can be stored and retrieved using the observation system, such as in instances where a limited amount of memory may be available in the tested system.

Figure 1:
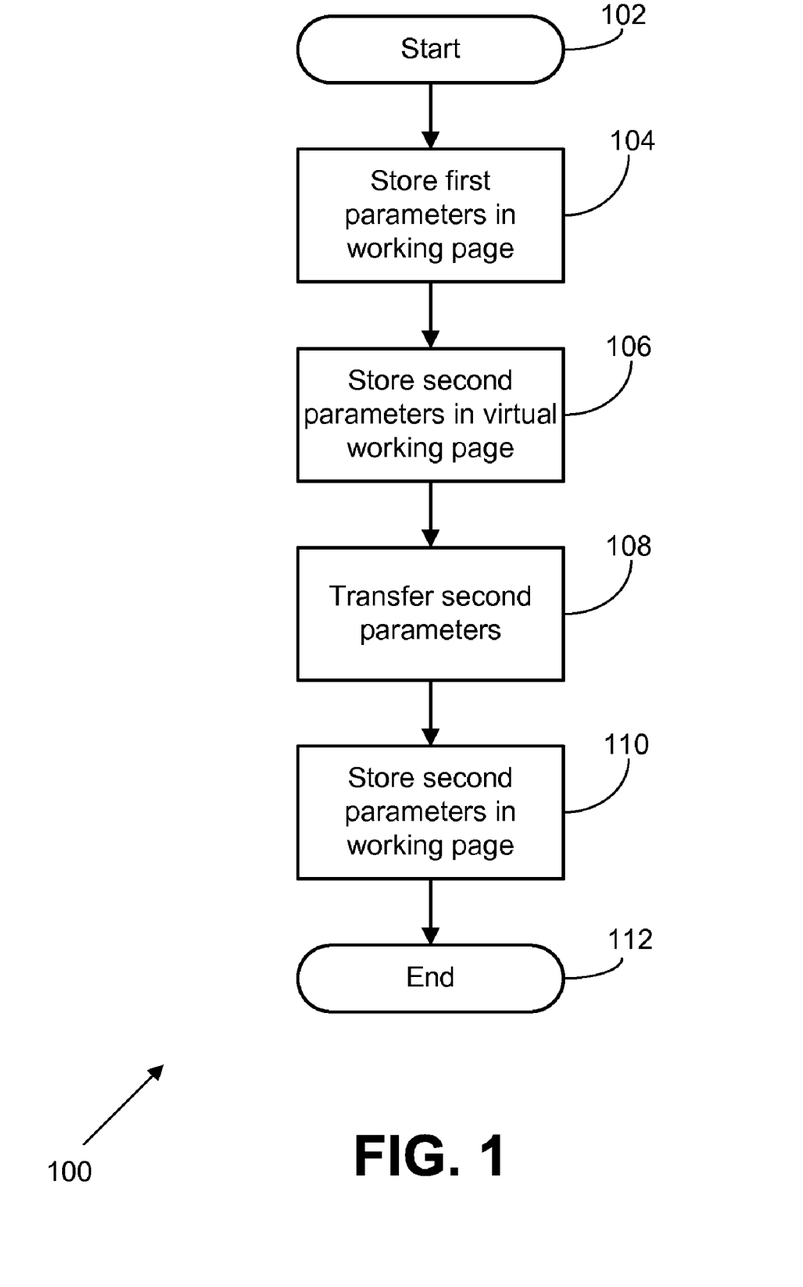
FIG. 1 is a flowchart of methods and systems for changing parameters in a tested system using virtual working pages, according to a possible embodiment of the present disclosure.

Referring now to FIG. 1, a flowchart of methods and systems for changing parameters in a tested system using virtual working pages is shown according to a possible embodiment of the present disclosure. The system 100 shown is configured to allow a user to selectively transfer contents of a plurality of virtual working pages held by an observation system into a working page in a tested system. The virtual working pages and the working page contain parameters used for controlling test operation of the tested system, and can be used to calibrate the tested system. In various possible embodiments, the tested system is an Electronic Control Unit, or ECU, configured to be used in a motor vehicle. Other tested systems may be used as well.

The system 100 is instantiated at a start operation 102. The start operation 102 corresponds to initiation of use of an observation system and a tested system. In a possible embodiment of the present disclosure, the observation system is a computing system, such as the system described in connection with FIG. 3. In a further possible embodiment of the present disclosure, the tested system is an Electronic Control Unit, such as can be found in a motor vehicle. In such embodiments, the observation system may include observation software, such as the INCA software package from ETAS GmbH, or other similar test observation and control systems. The observation system and tested system can be linked via an XCP communication channel, or other similar connection methods.

Operational flow proceeds to a working page storage module 104. The working page storage module 104 stores a first set of parameters in a working page within the tested system. The first set of parameters can include a number of possible parameters defining operation of the system, such as scalars, curves, maps, arrays, or strings.

Operational flow proceeds to a virtual working page storage module 106. The virtual working page storage module 106 stores a second set of parameters in a virtual working page, managed by the observation system. The second set of parameters can include the same parameters as the first set of parameters in the working page of the tested system, or can include additional or different parameters from those in the working page. In a possible embodiment, the virtual working page storage module 106 stores a plurality of different working pages accessible to or in a memory of the observation system. In a further possible embodiment, the working page storage module 104 corresponds to loading one or more virtual working pages from files provided to the observation system. In such an embodiment, the virtual working page storage module 106 may receive files of a variety of formats, such as PaCo, CDF V2.0, DCM, CVX or other file formats.

Operational flow proceeds to a transfer module 108. The transfer module 108 transfers the contents of one of the virtual working pages in the observation system to the tested system, such as via a communication link between the observation system and the tested system. In a possible embodiment, the transfer module executes in response to user selection of one of the virtual working pages for transfer to the working page.

Operational flow proceeds to a parameter storage module 110. The parameter storage module 110 corresponds to storage of one or more of the parameters from the virtual working page to the working page of the tested system. In one embodiment, the storage module 110 overwrites all of the first set of parameter values with all of the second set of parameter values received from the selected virtual working page observation system. In a further embodiment, the storage module overwrites only those parameter values for which replacement values are provided from the selected virtual working page.

Operational flow terminates at an end module 112.

Figure 2:
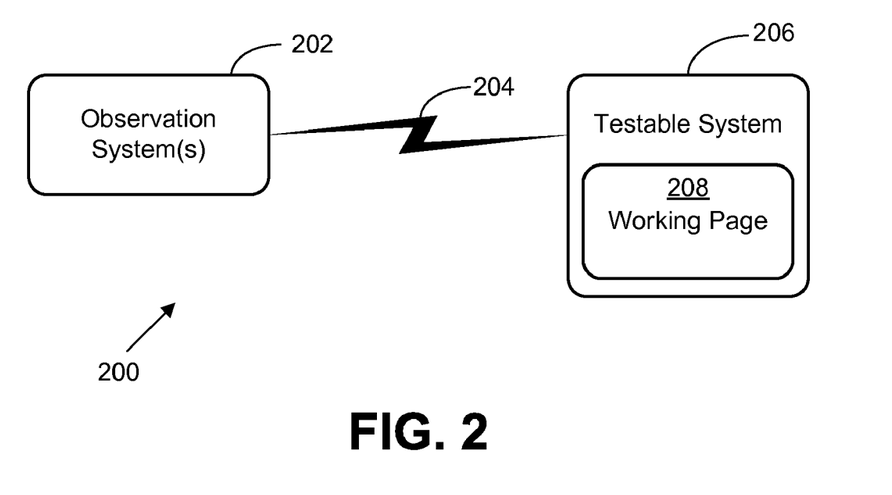
FIG. 2 shows a schematic of an exemplary test environment in which aspects of the present disclosure may be implemented.

Referring now to FIG. 2, a schematic of an exemplary test environment 200 is shown, in which aspects of the present disclosure may be implemented. The test environment includes an observation system 202 interfaced with a tested system 206 via a communication link 204. The observation system 202 represents one or more generalized computing systems, such as the system described below in conjunction with FIG. 3. In a possible embodiment, the observation system 202 is a specialized computing system, also referred to herein as a testbench or testbench system, used for testing a tested system. In such an embodiment, additional or specialized equipment may be added to or substituted into the generalized computing systems described herein.

The tested system 206 is a system generally requiring calibration and/or testing. In one embodiment of the present disclosure, the tested system 206 is an electronic control unit, and can be used in a motor vehicle to detect and calculate any of a number of characteristics of the vehicle or its environment, such as determining fuel consumption, monitoring exhaust gas valves, or other physical characteristics of the vehicle.

The communication link 204 can be any standard or proprietary communication link understandable and interfaceable to both the computing system 202 and tested system 206 incorporated into the test environment 200. In a possible embodiment, the communication link is a direct wired bus link. In other embodiments, the communication link 204 can be a networked communication system, such as any of a number of packet-based data communications networks. Other embodiments are possible as well.

In a particular embodiment in which the tested system 206 is an electronic control unit, the communication link 204 is configured to allow communications between the observation system 202 and tested system 206 using an XCP data communications protocol in which the observation system 202 includes an XCP master communications unit for sending and receiving data, and the tested system 206 includes an XCP slave communications unit for sending and receiving data. Other data communications protocols are possible as well, and may require differing communications links or standards for bandwidth or connectivity considerations.

The tested system 206 includes a working page 208 configured to store working parameters used by the tested system 206 during the test/calibration process. The working page 208 is stored in memory of the tested system 206, and is limited in size by the free memory of the test system after storage of data, instructions, and a reference page of original parameters are stored in the tested system. In one embodiment, the tested system 206 manages the working page in a read/write memory, such as a Random Access Memory, as discussed in detail below in conjunction with FIG. 4.

Figure 3:
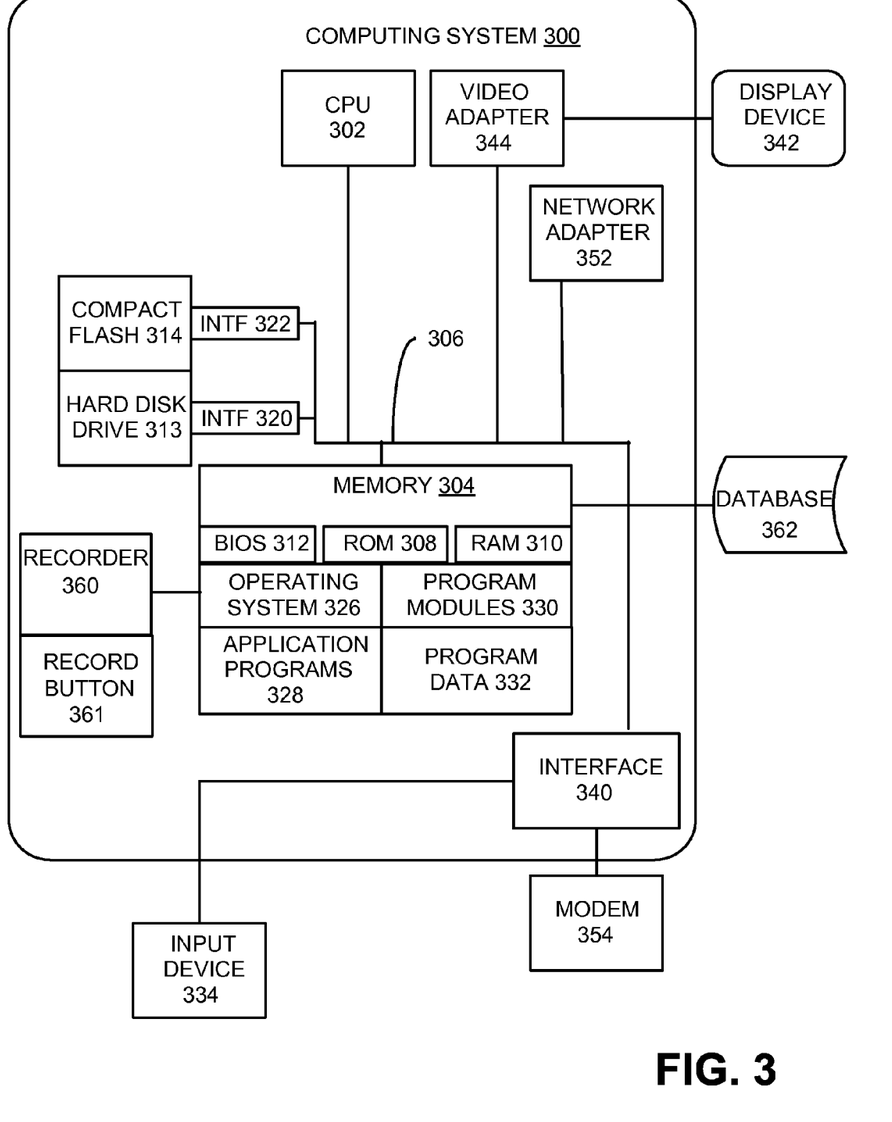
FIG. 3 shows an exemplary environment for implementing various aspects of the present disclosure.
Figure 5:
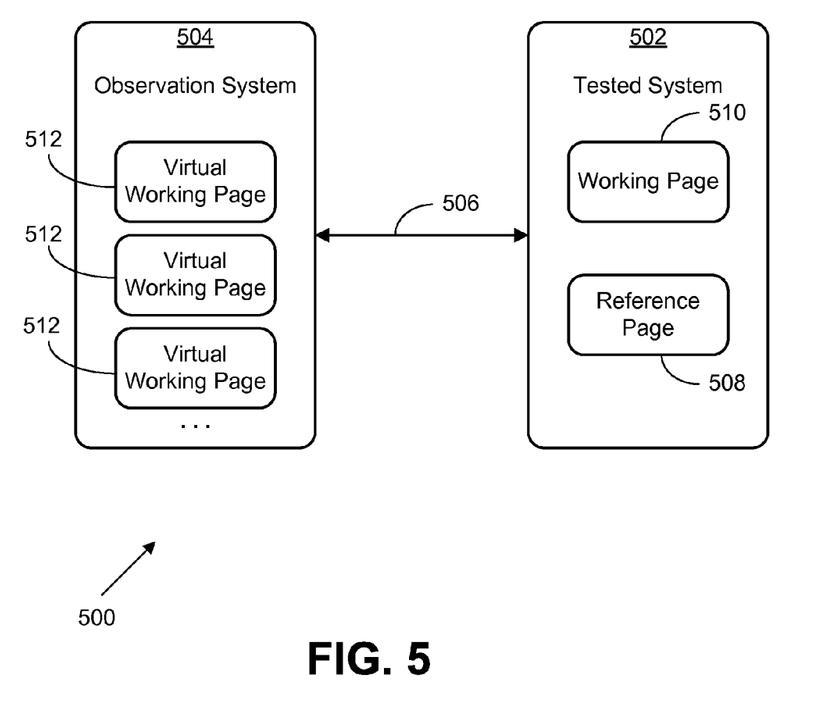
FIG. 5 is a schematic block diagram of an exemplary test environment in which aspects of the present disclosure may be implemented.

Referring now to FIG. 3, an exemplary environment for implementing various aspects of the present disclosure, such as the observation system of FIG. 2 or 5, includes a general purpose computing device in the form of a computing system 300, including at least one processing system 302. A variety of processing units are available from a variety of manufacturers, for example, Intel or Advanced Micro Devices. The computing system 300 also includes a system memory 304, and a system bus 306 that couples various system components including the system memory 304 to the processing unit 302. The system bus 306 might be any of several types of bus structures including a memory bus, or memory controller; a peripheral bus; and a local bus using any of a variety of bus architectures.

Preferably, the system memory 304 includes read only memory (ROM) 308 and random access memory (RAM) 310. System memory 304 is at least connected to an external database 362. A basic input/output system 312 (BIOS), containing the basic routines that help transfer information between elements within the computing system 300, such as during start up, is typically stored in the ROM 308.

Preferably, the computing system 300 further includes a secondary storage device 313, such as a hard disk drive, for reading from and writing to a hard disk (not shown), and/or a compact flash card 314.

The hard disk drive 313 and compact flash card 314 are connected to the system bus 306 by a hard disk drive interface 320 and a compact flash card interface 322, respectively. The drives and cards and their associated computer readable media provide nonvolatile storage of computer readable instructions, data structures, program modules and other data for the computing system 300.

Although the exemplary environment described herein employs a hard disk drive 313 and a compact flash card 314, it should be appreciated by those skilled in the art that other types of computer-readable media, capable of storing data, can be used in the exemplary system. Examples of these other types of computer-readable mediums include magnetic cassettes, flash memory cards, digital video disks, Bernoulli cartridges, CD ROMS, DVD ROMS, random access memories (RAMs), read only memories (ROMs), and the like.

A number of program modules may be stored on the hard disk 313, compact flash card 314, ROM 308, or RAM 310, including an operating system 326, one or more application programs 328, other program modules 330, and program data 332. A user may enter commands and information into the computing system 300 through an input device 334. Examples of input devices might include a keyboard, mouse, microphone, joystick, game pad, satellite dish, scanner, digital camera, touch screen, and a telephone. These and other input devices are often connected to the processing unit 302 through an interface 340 that is coupled to the system bus 306. These input devices also might be connected by any number of interfaces, such as a parallel port, serial port, game port, or a universal serial bus (USB). A display device 342, such as a monitor or touch screen LCD panel, is also connected to the system bus 306 via an interface, such as a video adapter 344. The display device 342 might be internal or external. In addition to the display device 342, computing systems, in general, typically include other peripheral devices (not shown), such as speakers, printers, and palm devices.

When used in a LAN networking environment, the computing system 300 is connected to the local network through a network interface or adapter 352. When used in a WAN networking environment, such as the Internet, the computing system 300 typically includes a modem 354 or other means, such as a direct connection, for establishing communications over the wide area network. The modem 354, which can be internal or external, is connected to the system bus 306 via the interface 340. In a networked environment, program modules depicted relative to the computing system 300, or portions thereof, may be stored in a remote memory storage device. It will be appreciated that the network connections shown are exemplary and other means of establishing a communications link between the computing systems may be used.

The computing system 300 might also include a recorder 360 connected to the memory 304. The recorder 360 includes a microphone for receiving sound input and is in communication with the memory 304 for buffering and storing the sound input. Preferably, the recorder 360 also includes a record button 361 for activating the microphone and communicating the sound input to the memory 304.

A computing device, such as computing system 300, typically includes at least some form of computer-readable media. Computer readable media can be any available media that can be accessed by the computing system 300. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system 300.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 4:
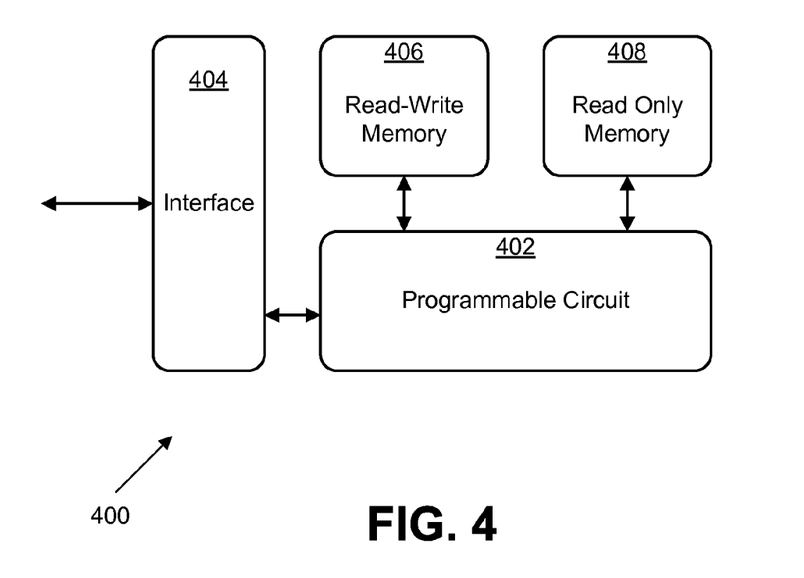
FIG. 4 is a schematic block diagram of a tested system according to a possible embodiment of the present disclosure.

Referring now to FIG. 4, a schematic block diagram of a tested system 400 is shown according to a possible embodiment of the present disclosure. The tested system 400 can be, for example, a possible configuration of the testable system described above in FIG. 2. The tested system 400 includes a programmable circuit 402 connected to an observation system, such as is described in FIGS. 2-3, through an interface 404. The programmable circuit 402 is any of a number of programmed or manufactured circuits configured to execute program instructions. In one possible embodiment, the programmable circuit 402 is a microcontroller, programmable in any of a number of programming languages, such as assembly language, C, or other low-level language. In alternate embodiments, the programmable circuit 402 is a programmable logic device (PLD) such as a field programmable gate array (FPGA), Complex Programmable Logic Device (CPLD), or Power ASIC (Application Specific Integrated Circuit). In these embodiments, a hardware description language such as Verilog, ABEL, or VHDL defines operation of the programmable circuit 402.

The interface 404 provides a standardized communication link between the tested system 400 and an observation system configured to communicate with and monitor the tested system. In one embodiment, the interface 404 is an XCP slave interface communicating with the observation system using XCP protocols. In further embodiments, different or additional protocols may be used by the communication interface 404.

The tested system 400 further includes a memory system including a read/write memory 406 and a read-only memory 408. The read/write memory 406 is configured to store instructions and data for use in connection with generalized operation of the tested system. The read/write memory 406 further includes extra memory space useable to hold various parameter values for use in operation of the tested system, referred to herein as a working page. The read-only memory 408 stores a reference page, which contains an original set of working parameters used for initialization of the working page when the tested system 400 initiates operation.

In certain embodiments, the read-only memory may not be included in the tested system 400, and the contents of the read-only memory, including the initial values of parameters for use by the system, may be stored in read-write memory. Use of read-only memory may be desired to ensure that the initial parameter values are not overwritten during operation of the system 400.

Additional components may be incorporated into the tested system 400 as a whole. In the example in which the tested system 400 is an electronic control unit for a motor vehicle, additional interfaces to various components in the vehicle may be included, and additional special-purpose hardware, such as sensors or other components may be included in the system 400 as well.

Referring now to FIG. 5, a schematic block diagram of a test environment 500 is shown in which aspects of the present disclosure may be implemented. The test environment includes a tested system 502 and an observation system 504, communicatively connected via a communications link 506. The tested system 502 is a system requiring test and calibration prior to installation in an operating environment. An exemplary tested system is described above, in conjunction with FIG. 4. The tested system 502 includes a reference page 508 and a working page 510. The reference page 508 stores initialization data, including initial parameter values, and can be located in a read-only or read-write memory. The working page 510 stores current parameter values, which initially may be parameter values read from the reference page 508, but may also include changed parameter values based on changes made by the tested system 502 itself, or by the observation system 504, as discussed herein.

The observation system 504 observes and communicates with the tested system 502 to track and allow user adjustment of the performance of the tested system 502. The observation system can be any of a number of computing systems configured to interface with a tested system, such as the generalized computing system described above in conjunction with FIG. 3. The observation system 504 includes one or more virtual working pages 512, each of which contain a set of parameters useable to alter the performance of the tested system 502. Although it is preferable that the virtual working pages 512 be of the same size as the working page 510, the virtual working pages 512 need not contain values for the same parameters, and also need not contain the same number of parameters. Writing the contents of a virtual working page 512 into the working page 510 may therefore only partially overwrite the working page 510, leaving the contents of the working page 510 for parameters not set in the selected virtual working page 512. Contents of the various virtual working pages 512 may be displayed to a user of the observation system 504, such as via a user interface shown in FIG. 6.

In certain embodiments, one or more of the virtual working pages 512 are configured to store the original contents of the working page 510 and/or the reference page 508. Such embodiments allow the observation system to restore these values to the tested system 502 in an instance in which performance of the tested system 502 degrades to the point where restarting a test or restoration of original values is otherwise desired. In further embodiments, one or more of the virtual working pages is loaded from a file of one of a variety of formats, such as PaCo, CDF V2.0, DCM, CVX or other file format.

In various possible embodiments, the tested system 502 can be an electronic control or monitoring unit, such as an electronic control unit (ECU) which may be found on a motor vehicle. In such embodiments, the observation system 504 can be any of a number of test, simulation, or observation systems for use in conjunction with an ECU, such as the INCA monitoring and calibration system provided by ETAS GmbH. The communications link 506 corresponds to the link 204 of FIG. 2, and can represent any of a number of communications interfaces between a tested system 502 and an observation system 504, such as a wired communication link using an XCP communication protocol between an XCP master on the observation system and an XCP slave on the tested system (not shown). In additional embodiments, various types of wired and wireless communications links are possible as well.

Figure 6:
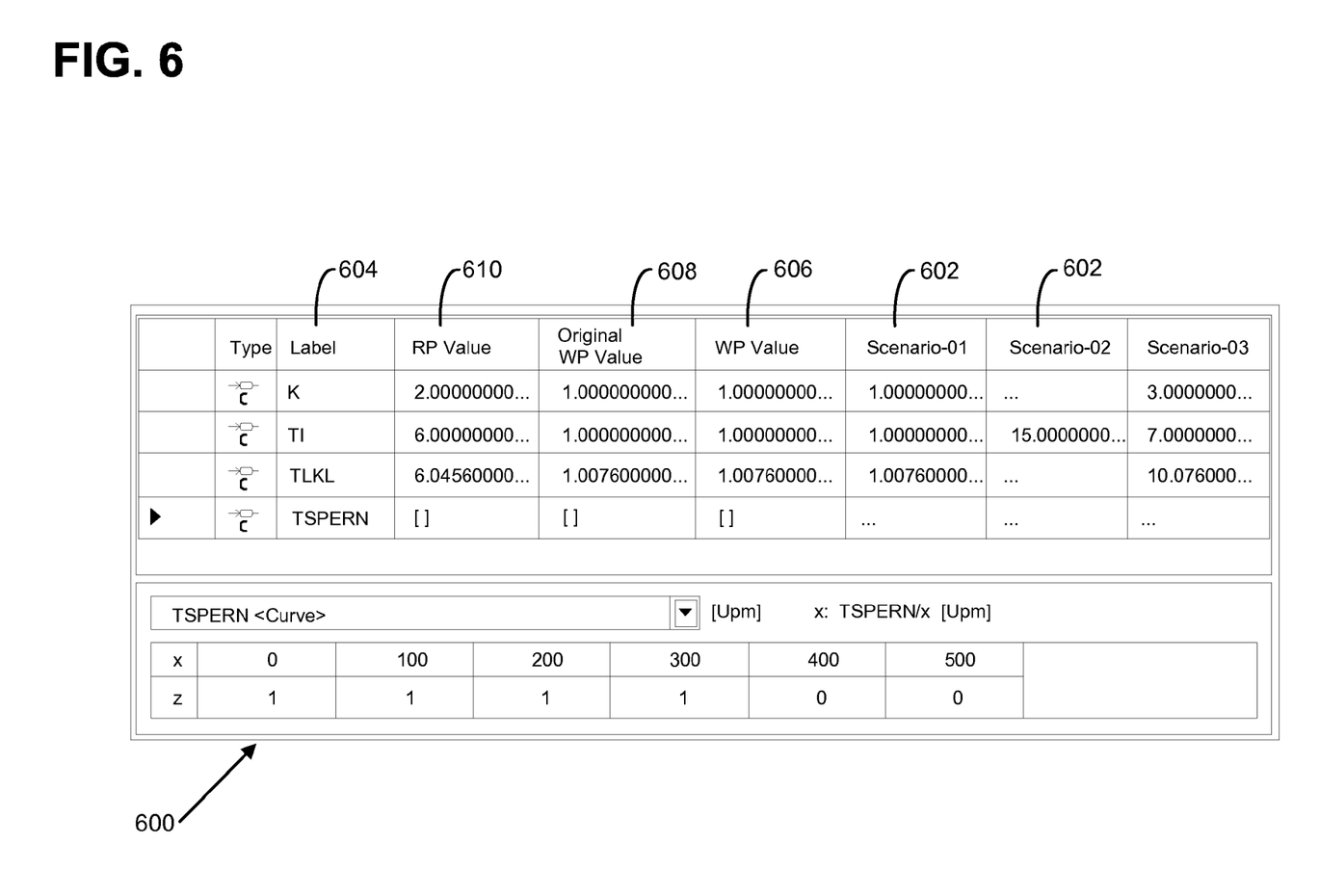
FIG. 6 displays a user interface useable to display the contents of one or more virtual working pages according to a possible embodiment of the present disclosure.

Referring now to FIG. 6, a user interface 600 is shown which displays the contents of one or more virtual working pages according to a possible embodiment of the present disclosure. The user interface 600 displays on a display device of an observation system such as those disclosed in FIGS. 2-3 and FIG. 5, or on a computer system communicatively connected with such an observation system. The user interface 600 displays a table configured to display the contents of the virtual working pages, each containing parameters for testing and calibration of a tested system. The user interface 600 optionally also displays the contents of the working page and the reference page of a tested system as described in conjunction with FIG. 5, above.

In the interface 600 shown, a plurality of virtual working page columns 602 display the contents of the various virtual working pages stored in the observation system. A label column 604 displays a label in each row indicating the parameter associated with each of the values in the column associated with that virtual working page 602. A working page column 606 displays the contents of the current working page, and may be read from either a virtual working page held within the observation system, or may be read directly from the working page of a tested system interfaced with the observation system. An original working page column 608 displays the contents of the working page at initiation of the test or calibration process, and a reference page column 610 displays the contents of the reference page of the tested system.

In additional embodiments of the user interface 600, various color schemes are implemented in the table to display to a user differences between the parameters in the various virtual working pages, the working page, the original working page contents, and the reference page. For example, the user interface 600 shows the working page column 606 highlighted, to indicate that the parameter values in that column represent the current operational characteristics of a tested system. Other possible configurations may highlight individual parameters in the various columns to show differences between the virtual working pages or to show user selection of one or more of the parameters for editing or downloading to the tested system.

In further embodiments, the user interface 600 incorporates additional columns or other graphical elements to convey other operational information tracked by the observation system during testing and calibration of the tested system.

Figure 7:
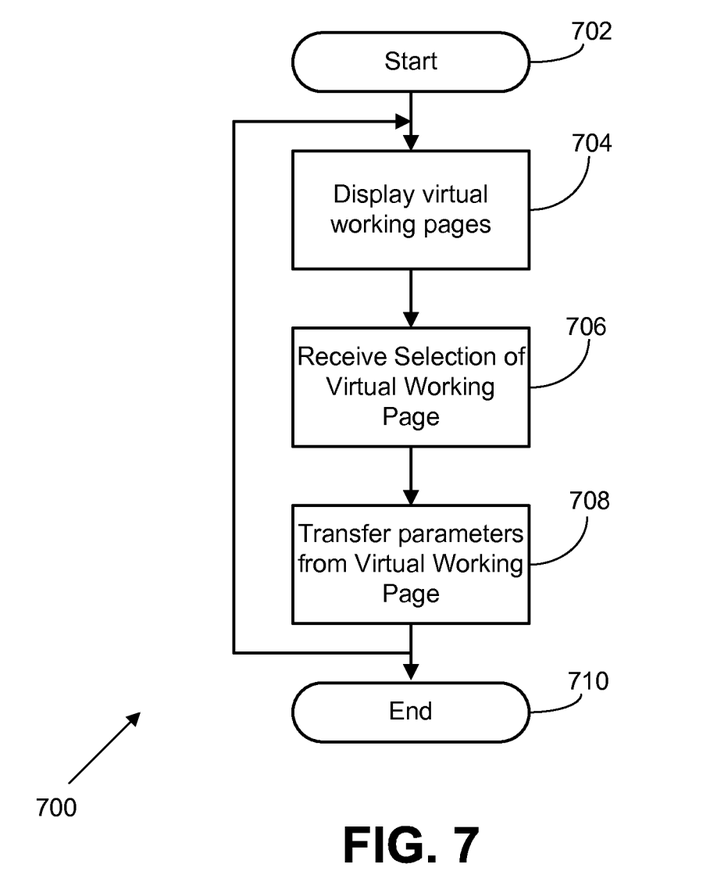
FIG. 7 is a flowchart of systems and methods for changing parameters in a tested system using virtual working pages, according to a further possible embodiment of the present disclosure.

Referring now to FIG. 7, a flowchart of systems and methods for changing parameters in a tested system using virtual working pages is shown according to a further possible embodiment of the present disclosure. The system 700 manages a plurality of virtual working pages accessible to or stored on an observation system. The system 700 may execute on an observation system such as those shown in FIGS. 2-3 and FIG. 5.

Operational flow within the system 700 is instantiated at a start operation 702. The start operation 702 corresponds to initiation of a test or calibration of a tested system. Operational flow proceeds to a display module 704. The display module 704 displays the contents of one or more virtual working pages managed by the observation system to a user, such as on a display device. Exemplary output of the display module 704 may take the form of the user interface 600 shown in FIG. 6. Various additional embodiments of the display module 704 display the contents of the virtual working pages in a variety of other graphical formats, display the contents of the current working page, display the contents of the original working page, or display the contents of the reference page.

Operational flow proceeds to a selection module 706. The selection module 706 receives selection of a virtual working page from a user, from among those virtual working pages displayed by the display module 704. In a further embodiment, the selection module 706 receives selection of one or more parameters contained in one or more of the virtual working pages displayed to the user. In yet another embodiment, the selection module 706 receives selection of a stored working page or a reference page, the contents of which were displayed to the user by the display module 704.

Operational flow proceeds to a transfer module 708. The transfer module 708 transfers the selected parameters from the virtual working page, working page, or reference page from the observation system to the tested system via a communication link. The transfer module 708 optionally confirms that the data transfer from the observation system to the tested system takes place, and optionally displays a confirmation message to the user confirming transfer of the selected parameters to the tested system.

Operational flow proceeds to the display module 704 until completion of the test, upon which time operational flow proceeds to an end operation 710, which corresponds to completion of the test or calibration of the tested system.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A method in a computer system for displaying on a display device a plurality of virtual working pages, wherein each of the virtual working pages including a set of parameters useable for calibration of a tested system, and wherein the computer system is separate from and interfaceable with the tested system comprising an electronic control unit of a motor vehicle control system, the method comprising:
    storing the plurality of virtual working pages in a memory of the computer system; and
    displaying a table having columns and rows, at least one column representing contents of one of the plurality of virtual working pages, the rows representing parameters useable for calibration of the electronic control unit.

2. The method of claim 1, further comprising displaying in a column contents of a working page of the tested system.

3. The method of claim 1, further comprising displaying in a column contents of a reference page of the tested system.

4. The method of claim 1, further comprising displaying in a column contents of an original working page of the tested system.

* * * * *